United States Patent
Gardner et al.

(10) Patent No.: US 9,987,715 B2
(45) Date of Patent: Jun. 5, 2018

(54) SYSTEM FOR IDENTIFYING AND DUPLICATING MASTER KEYS

(71) Applicant: Minute Key Inc., Boulder, CO (US)

(72) Inventors: Richard L Gardner, Loveland, CO (US); Bradford Shayne Cooley, Escondido, CA (US); David Kortbawi, Escondido, CA (US)

(73) Assignee: MINUTE KEY INC., Boulder, CO (US)

( * ) Notice: Subject to any disclaimer, the term of this patent is extended or adjusted under 35 U.S.C. 154(b) by 0 days. days.

(21) Appl. No.: 15/728,074

(22) Filed: Oct. 9, 2017

(65) Prior Publication Data

US 2018/0065226 A1    Mar. 8, 2018

Related U.S. Application Data (63) Continuation of application No. 15/191,071, filed on Jun. 23, 2016, now Pat. No. 9,808,900.
(Continued)

(51) Int. Cl.
*G01B 11/24*    (2006.01)
*B23Q 35/00*    (2006.01)
*G01B 5/00*    (2006.01)

(52) U.S. Cl.
CPC ........... *B23Q 35/00* (2013.01); *G01B 5/0018* (2013.01); *G01B 11/24* (2013.01);
(Continued)

(58) Field of Classification Search
CPC ...... G01B 5/0018; G01B 11/24; B23Q 35/00; B23C 2235/24; B23C 2235/32; B23C 2235/41; B23C 2260/56; B23C 2260/76
See application file for complete search history.

(56) References Cited

U.S. PATENT DOCUMENTS 3,796,130 A    3/1974    Gartner
5,627,549 A    5/1997    Park
(Continued)

FOREIGN PATENT DOCUMENTS

WO    2008071619    6/2008

OTHER PUBLICATIONS

Final Rejection dated Mar. 7, 2017 from related/corresponding U.S. Appl. No. 13/964,017, filed Aug. 9, 2013.
(Continued)

*Primary Examiner* — Michael P Stafira
(74) *Attorney, Agent, or Firm* — Jones Day (57) ABSTRACT

A system for duplicating a master key includes a mechanism for receiving and positioning a master key. The master key defines a major key axis and an intermediate key axis along which a key blade variably extends, and a minor key axis along a key thickness. Optical path components direct a light beam along the minor key axis. The light beam impinges upon the key blade. A portion of the light beam traverses the key blade. A detector receives the portion of the light beam that traverses the key blade. An apparatus imparts relative motion along the major key axis between the light beam and the master key. The light beam scans along the major key axis of the master key. A processor receives a signal from the detector as the beam scans along the major key axis and generates information usable for defining the machining of a duplicate key.

12 Claims, 7 Drawing Sheets

Related U.S. Application Data (60) Provisional application No. 62/185,078, filed on Jun. 26, 2015.

(52) U.S. Cl.
CPC ...... *B23C 2235/24* (2013.01); *B23C 2235/32* (2013.01); *B23C 2235/41* (2013.01); *B23C 2260/56* (2013.01); *B23C 2260/76* (2013.01)

(56) References Cited

U.S. PATENT DOCUMENTS

| | | | |
|---|---|---|---|
| 5,908,273 A * | 6/1999 | Titus | ......................... B23C 3/35 250/202 |
| 7,346,562 B2 | 3/2008 | Inoue | |
| 8,688,579 B1 | 4/2014 | Ethington | |
| 8,979,446 B2 | 3/2015 | Freeman | |
| 2002/0031251 A1 | 3/2002 | Campbell | |
| 2006/0048553 A1 | 3/2006 | Almquist | |
| 2011/0176881 A1 | 7/2011 | Bass et al. | |
| 2011/0297691 A1 | 12/2011 | Freeman | |
| 2013/0173044 A1 | 7/2013 | Marsh | |
| 2014/0064597 A1 | 3/2014 | Fagan | |

OTHER PUBLICATIONS

Office Action dated Feb. 23, 2017 from related/corresponding U.S. Appl. No. 14/920,060, filed Oct. 22, 2015.

International Search Report and Written Opinion dated Sep. 13, 2016 in related/corresponding International PCT Patent Appl. No. PCT/US16,39030, filed Jun. 23, 2016.

International Preliminary Report on Patentability and Written Opinion dated Jan. 4, 2018 in PCT/US2016/039037, filed Jun. 23, 2016.

\* cited by examiner

SYSTEM FOR IDENTIFYING AND DUPLICATING MASTER KEYS

CROSS-REFERENCE TO RELATED APPLICATION

This is a continuation of U.S. application Ser. No. 15/191,071, filed Jun. 23, 2016, which claims priority to U.S. Provisional Application No. 62/185,078, filed Jun. 26, 2015. All of the above applications are hereby incorporated herein by reference.

TECHNICAL FIELD

This is directed to the field of key duplication and, more specifically, to the field of apparatuses and methods of automatically analyzing master keys in an automated and very accurate manner.

BACKGROUND

Various key duplication systems exist for receiving and duplicating a master key. More recent key duplication systems can be automated. Such systems have to perform certain functions.

First, a proper key blank needs to be selected. A typical key blank is characterized factors such as a keyway which is defined by a geometry of a cross-section of a key. An improperly selected key blank will result in an attempted duplicate that cannot be inserted into a lock. Some systems rely on a user to select a proper key blank. This may lead to human error. There is a desire to provide highly reliable automated key blank selection.

Second, the master key needs to be analyzed to obtain the correct "bitting pattern" which defines the shape of a master key blade. An improper determination of the bitting pattern will result in the key not opening a particular lock.

There is an ongoing need to improve the reliability and accuracy of systems that select key blanks and determine bitting patterns for the purpose of key duplication.

SUMMARY

A system and method of the present disclosure concerns an accurate and reliable system and method for analyzing and machining a duplicate for a master key. The master key geometrically defines three mutually orthogonal axes including a major key axis which is the longest axis of the master key, an intermediate key axis along which a key blade variably extends, and a minor key axis along a key thickness. The variable extent of the key blade defines a bitting of the master key.

In one aspect of the disclosure a key duplication system includes various major components including the following: (1) a clamping mechanism for receiving and positioning the master key; (2) optical path components that direct a light beam along the minor key axis whereby the light beam impinges upon the key blade such that a portion of the light beam traverses the key blade; (3) a detector that receives the portion of the light beam that traverses the key blade; (4) an apparatus that imparts relative motion along the major key axis between the light beam and the master key whereby the light beam scans along the major key axis of the master key; (5) a processor that receives a signal from the detector as the beam scans along the major key axis and generates information useable for defining the machining of a duplicate key.

In one implementation the clamping mechanism holds the master key in a fixed stationary location. Thus the relative motion between the light beam and the master key along the major key axis is a result of motion of the light beam.

In another implementation the key duplication system includes a moveable stage configured to move along the major key axis. The optical path components are affixed to the moveable stage whereby the moveable stage is the apparatus that imparts the relative motion along the major key axis between the light beam and the master key. In one embodiment the optical path components include beam directing components that redirect the light beam between a laser and the key blade and/or between the key blade and a detector. In a more particular embodiment the optics include first and second beam directing components. The first beam directing component redirects the light beam between the laser and the key blade. The second beam directing component redirects the light beam between the key blade and the detector. In yet a more particular embodiment the first beam directing component is a first mirror that receives the light beam directed along a −Y direction along the major key axis and then redirects the light to a +X direction along the minor key axis. The second beam directing component is a second mirror that receives the light beam from the first mirror after having traversed the key blade and then redirects the light to a +Y direction along the major key axis.

In a further implementation the key duplication system includes a moveable stage configured to move along the major key axis. The optical path components that direct the light beam are affixed to the moveable stage whereby movement of the optical stage along the major key axis imparts the relative motion between the light beam and the master key. The optical path components include a light source and a detector. In one embodiment the light source is a laser. In another embodiment the detector is a position sensitive detector (PSD).

In yet another implementation the optical path components include (1) a laser for generating a light beam, (2) a slit for forming the beam whereby the beam exiting the slit is narrowed along a first axis and wide along the intermediate key axis to allow the beam to partially traverse the master key blade. The light beam impinging upon and traversing the blade is narrow along the major key axis (Y). This provides a higher resolution in analyzing the bitting pattern. The light beam impinging upon and traversing the blade is wide along the intermediate key axis (Z). This enables the measurement of a wide range of bitting patterns. The detector is a one dimensional position sensitive detector (PSD) with the long axis of the PSD aligned with the intermediate key axis Z. In one embodiment the location of the centroid of the light beam along the intermediate key axis Z is detected as a measure of the height of the key blade.

In another aspect of the disclosure, a method for duplicating a master key includes: (1) receiving and clamping the master key; (2) generating a light beam extending along the minor key axis and partially traversing the key blade before reaching a detector; (3) imparting relative motion along the major key axis between the light beam and the master key whereby the light beam scans along the major key axis; (4) the detector generating a signal versus time that corresponds to the height or profile of the key blade along the intermediate axis.

In one implementation, receiving and clamping the master key includes affixing the master key in a stationary configuration. The relative motion is due to motion of the light beam.

In another implementation, optical path components directing the light beam are affixed to a movable stage. Motion of the moveable stage thereby imparts the relative motion between the light beam and the master key. In one embodiment generating the light beam includes activating a laser. In a further embodiment the optical path components include first and second beam directing components and the method further includes receiving the light beam from the laser, the first beam directing component redirecting the light beam from the laser toward the key blade, the second beam directing component redirecting the light beam from the key blade to the detector. In yet a more specific embodiment the first beam directing component is a first mirror and the second beam directing component is a second mirror, the first mirror redirecting the light beam from along the major key axis to the minor key axis, the second mirror redirecting the light beam from along the minor key axis to the major key axis.

In a further implementation a camera is mounted on a moveable stage and the method further comprising the camera capturing an image of the end of the key. In one embodiment the detector is used to detect and determine a location of a distal end of the master key. The determined location is used by the system to properly position the camera.

In a further aspect of the disclosure a key duplication system includes: a mechanism for receiving and clamping a master key in a fixed position, the master key defining a major key axis, an intermediate key axis along which a key blade variably extends, and a minor key axis along a key thickness; a light source that generates a light beam; a detector; a moveable stage configured to move along the major key axis; optical path components affixed to the movable stage that receive the light beam from the light source and direct the light beam to partially traverse the key blade and then to pass the light beam from the key blade to the detector whereby motion of the moveable stage causes the light beam to scan along the major key axis; a processor that receives a signal from the detector and provides information used to machine a duplicate key.

In one implementation the light source and/or the detector are affixed to the moveable stage. In one embodiment the light source is a laser. In a further embodiment the detector is a position sensitive detector (PSD). The PSD detects a light level and/or the position of a light spot received via the light beam. In a particular embodiment the PSD is a one-dimensional PSD that is particularly sensitive to a spot of light that is elongate along the intermediate key axis Z. The PSD has an axis of elongation that is aligned with the intermediate key axis Z.

In another implementation the optical path components include a first beam directing component and a second beam directing component. The first beam directing component receives the light beam along the major key axis and redirects the light beam along the minor key axis before the light beam reaches the key blade. The second beam directing component receives the light beam along the minor key axis from the key blade and redirects the light beam along the major key axis before the light beam reaches the detector.

In a further implementation the optical path components include a first mirror and a second mirror. The first mirror receives the light beam from the light source travelling in a −Y direction along the major key axis and redirects the light beam to a +X direction along the minor key axis before the light beam reaches the key blade. The second mirror receives the light beam travelling in a +X direction from the key blade and redirects the light beam to a +Y direction before the light beam reaches the detector.

In yet another implementation a camera is mounted to the moveable stage. The camera is for capturing an end image of the key for identifying a proper key blank.

DETAILED DESCRIPTION

Figure 1A:
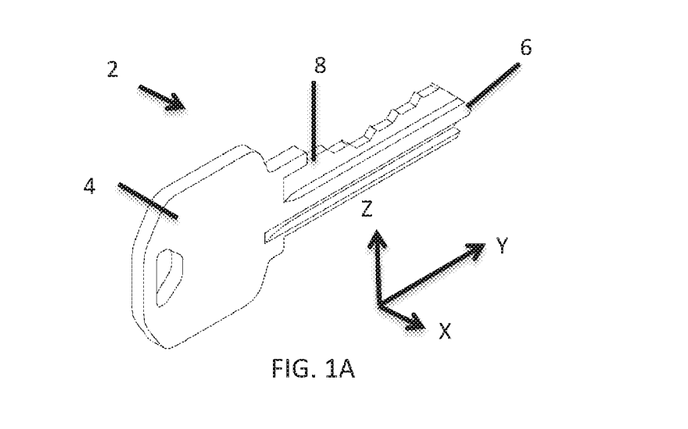
FIG. 1A is an isometric view of an exemplary master key.
Figure 1B:
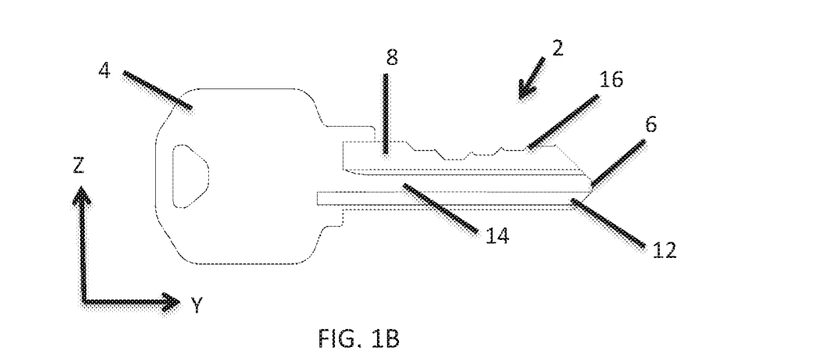
FIG. 1B is a side view of an exemplary master key.
Figure 1C:
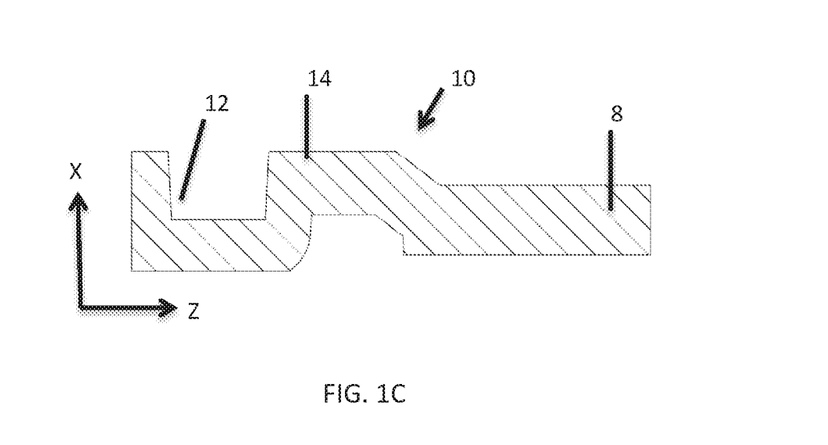
FIG. 1C is a cross sectional view of an exemplary master key illustrating the keyway.

FIGS. 1A, 1B, and 1C are isometric, side, and cross sectional views of an exemplary master key 2 to be analyzed for purposes of duplication. According to this description, a master key 2 is any key that a user or customer desires to duplicate such as a house key, a key to a storage unit, a key to automobile, or any other key that mechanically opens or closes a lock.

To illustrate master key 2, three mutually orthogonal axes X, Y, and Z are defined. Minor key axis X is defined along the thickness of master key 2. Major key axis Y is defined along the longest axis of master key 2. Head 4 and distal end 6 of master key 2 are disposed along major key axis Y. Intermediate key axis Z is the defined as the direction along which key blade 8 variably extends.

Master key 2 is uniquely defined by various factors including a (1) keyway 10, and (2) bittings or teeth formed into key blade 8. Keyway 10 is defined by a cross section 10 of master key 2. The keyway 10 has features such as channels 12 and ridges 14 that allow the master key 2 to slide into a particular lock. The channels 12 and ridges 14 define a variable extent of a portion of key blade 8 along minor key axis X.

Key blade 8 extends variably along intermediate axis Z. The variable extent of key blade 8 defines features such as key teeth 16. The variable extent of key blade 8 defines the bitting of master key 2. The bitting of master key 2 determines which specific lock master key 2 can unlock and lock.

Figure 2:
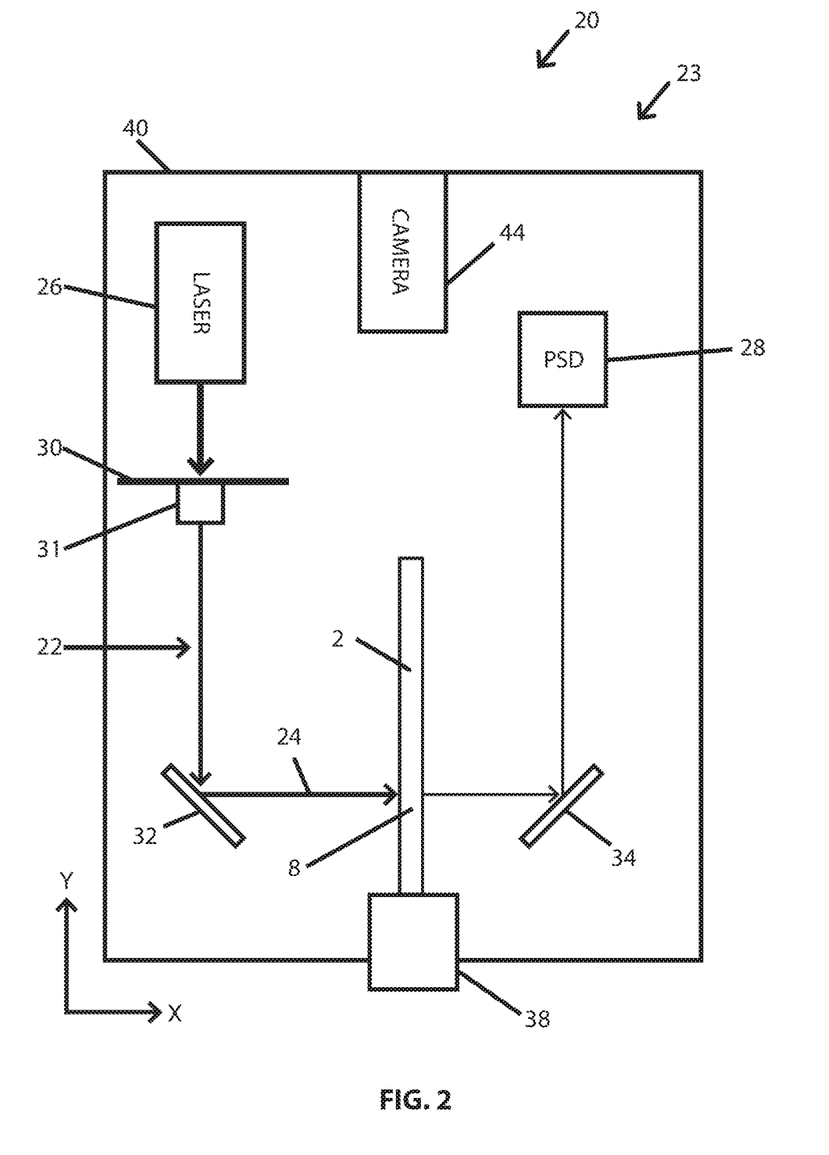
FIG. 2 is a schematic plan view of an exemplary system 20 utilized for analyzing and duplicating a master key.

FIG. 2 is a schematic representation of an exemplary system 20 for analyzing a master key 2 to be duplicated. System 20 defines an optical path 22 along which a light beam 24 travels between a light source 26 and a detector 28. The light beam 24 traverses and overlaps a portion of key blade 8. An amount of light that reaches detector 28 is a function of the height of key blade 8 along the intermediate key axis Z. System 20 imparts a relative motion along major key axis Y between light beam 24 and master key 2. In doing so the detector 28 receives a variable amount of light versus time that corresponds to the extent of key blade 8 along intermediate key axis Z.

The optical path 22 is defined or formed by a number of optical path components 23. The optical path components 23 can include one or more of a light source 26, a detector 28, a beam shaping component 30, and beam directing components 32 and 34. In an exemplary embodiment the light source 26 is a laser. Detector 28 is a position sensitive detector (PSD) 28. Beam shaping component 30 is a slit 30. Optical path components 23 can also include a cylindrical lens 31 for collimating the light beam 24. Beam directing components 32 and 34 include a first beam directing component 32 and a second beam directing component 34. The first beam directing component 32 receives the light beam 24 from light source 26 and redirects the light beam 24 toward the key blade 8. The second beam directing component 34 receives the light beam 24 from the key blade 8 and redirects the light beam 24 toward the detector 28. Beam directing components 32 and 34 can be mirrors 32 and 34 respectively. In an alternative embodiment beam directing components 32 and 34 can be prisms 32 and 34 respectively.

According to a particular embodiment embodiment light source 26 is a laser that generates beam 24 that travels in a −Y direction along the major key axis Y. Light beam 24 first encounters slit 30 that reduces the cross-sectional area of light beam 24 and forms a beam having a cross section that is elongate along intermediate key axis Z and otherwise narrowed orthogonally to the direction of travel. Next, the light beam 24 encounters first mirror 32 that deflects light beam 24 from the −Y direction to the +X direction along the minor key axis X. Light beam 24 then impinges upon key blade 8 which over which a portion of the light beam 24 is able to traverse and to continue along in the +X direction. Next, light beam 24 encounters second mirror 34 which deflects light beam 24 from the +X direction to the +Y direction. Light beam then travels to detector 28.

Detector 28 is a position sensitive detector (PSD) 28. PSD 28 receives light beam 24 and generates a signal that is related to a location ZC of a centroid along intermediate axis Z of the light beam 24 that has traversed key blade 8. In one embodiment the PSD 28 outputs two signals that are processed in order to determine the centroid Z-axis coordinate ZC. The centroid Z-axis coordinate ZC will tend to linearly increase with the height of key blade 8 over which light beam traverses. Thus the value of ZC over time can be used to compute the profile or bitting of master key 2.

Figure 3:
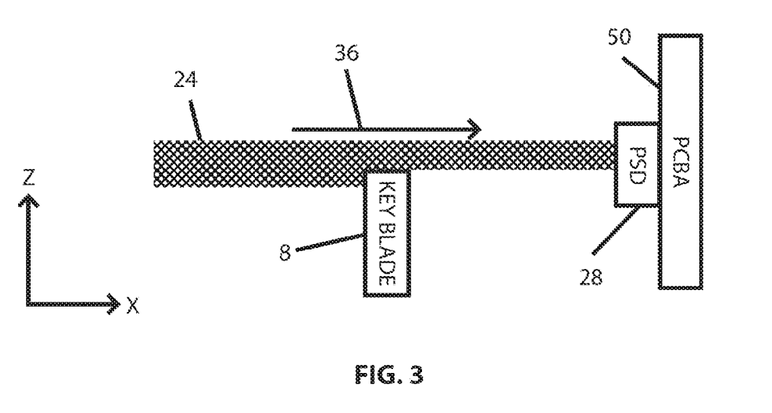
FIG. 3 is a side view depicting a light beam partially traversing the blade of a master key.

A side view of a portion of system 20 is illustrated in FIG. 3 with emphasis on the effect of key blade 8 upon light beam 24. Mirror 34 is eliminated from FIG. 3 for illustrative simplicity. Light beam 24 travels along direction 36 and partially impinges upon key blade 8. Only an upper portion of light beam 24 traverses key blade 8 because key blade 8 blocks a portion of light beam 24. The amount of light beam 24 that traverses key blade 8 is a function of the extent of key blade 8 along intermediate key axis Z. PSD 28 generates an output signal that is a function of the amount of light received past key blade 8. Thus the output signal of PSD 28 varies with the vertical extent of key blade 8 along intermediate axis Z. The output signal of PSD 28 is processed to determine the centroid coordinate ZC of the light beam 24 that traverses the key blade 8. As the key blade extends farther in the +Z direction the centroid coordinate ZC of the light beam 24 that traverses key blade 8 has a correspondingly increased Z-value.

Referring to FIGS. 2 and 3, the function and advantage of slit 30 is apparent. Slit 30 reduces the width of light beam 24 along the Z and Y axes just before the light beam reaches key blade 8 (after first mirror 32). After the light beam 24 has reflected from mirror 32 the width of the light beam 24 is reduced along the major key axis Y while still relatively wide along the intermediate key axis Z as the light beam 24 partially traverse the key blade 8. The reduction of light beam 24 width along the major key axis Y has the effect of increasing the resolution of system 20 which enables a more accurate measurement of key bitting. At the same time, the wider light beam 24 along the intermediate key axis Z increases the range of extent of key blade 8 along the intermediate key axis Z that can be measured.

In one embodiment the light beam 24 has a width along the intermediate key axis Z that is in a range of 5 millimeters to 10 millimeters. In a more particular embodiment the width of light beam 24 along the intermediate key axis Z is in a range of 5 millimeters to 7 millimeters. In one particular embodiment the width of light beam 24 along the intermediate key axis Z is 6 about millimeters. This will generally accommodate keys having a blade width measured along intermediate key axis Z of up to 5 millimeters. Minimizing the width of the light beam 24 along the intermediate key axis 8 helps to maximize a sensitivity to the height of blade 8 along intermediate key axis 8. Other light beam widths along intermediate key axis Z may be utilized depending on the expected widths of key blade 8 along intermediate axis Z. In an exemplary embodiment the with of the beam along intermediate key axis Z just exceeds the maximum expected key blade width.

In one embodiment the light beam 24 has a width along the major key axis Y that is less than 1 millimeter. In another embodiment the light beam 24 has a width along the major key axis Y that is less than 0.5 millimeter. In a further embodiment the light beam 24 has a width along the major key axis Y that is about 0.25 millimeter.

Referring back to FIG. 2 the master key 2 is held in a stationary position by a clamping mechanism 38. System 20 also includes moveable stage 40 that is configured to linearly translate along key major axis Y. Affixed or mounted to moveable stage 40 are optical path components including laser 26, mirrors 32 and 34, and PSD 28. Thus, the motion of moveable stage 40 defines and imparts the motion of optical path 22. The motion of stage 40 along major key axis Y determines the relative motion between light beam 24 and key blade 8 whereby the light beam 24 scans along key blade 8. The scanning of light beam 24 along key blade 8 results in a light beam 24 whose cross sectional area varies with time reaching PSD 28. The scanning of light beam 24 along key blade 8 also results in a light beam 24 that traverses key blade 8 and reaches PSD 28 whose centroid coordinate ZC varies with time. The time variation is a function of height of key blade 8 along intermediate key axis Z. PSD then outputs a time varying signal that is indicative of or correlates with the profile of key blade 8 along intermediate axis Z.

Figure 4:
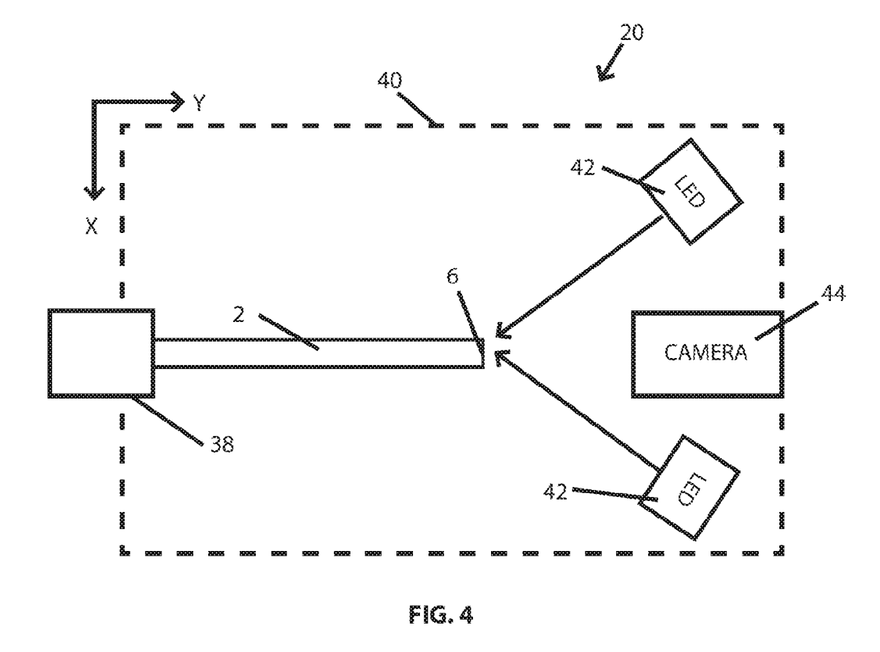
FIG. 4 is a schematic plan view of an exemplary system 20 utilized for analyzing and duplicating a master key.

FIG. 4 is a schematic representation of system 20 to illustrate a subsystem including light sources 42 and camera 44. Light sources 44 can be light emitting diodes (LEDs) 42 that are positioned to illuminate a surface of distal end 6 of master key 2. Camera 44 receives light generally reflected in the +Y direction from distal end 6 to provide an image that represents the keyway 10 (see FIG. 1C). The resultant image may then be used to determine a key blank having the proper keyway for duplication of master key 2. In one embodiment light sources 42 and camera 44 are mounted to moveable stage 40. In another embodiment light sources 42 are fixed and camera 44 is mounted to moveable stage 40. In yet another embodiment light sources 42 are fixed and camera 44 is configured to translate independently of moveable stage 40.

Figure 5:
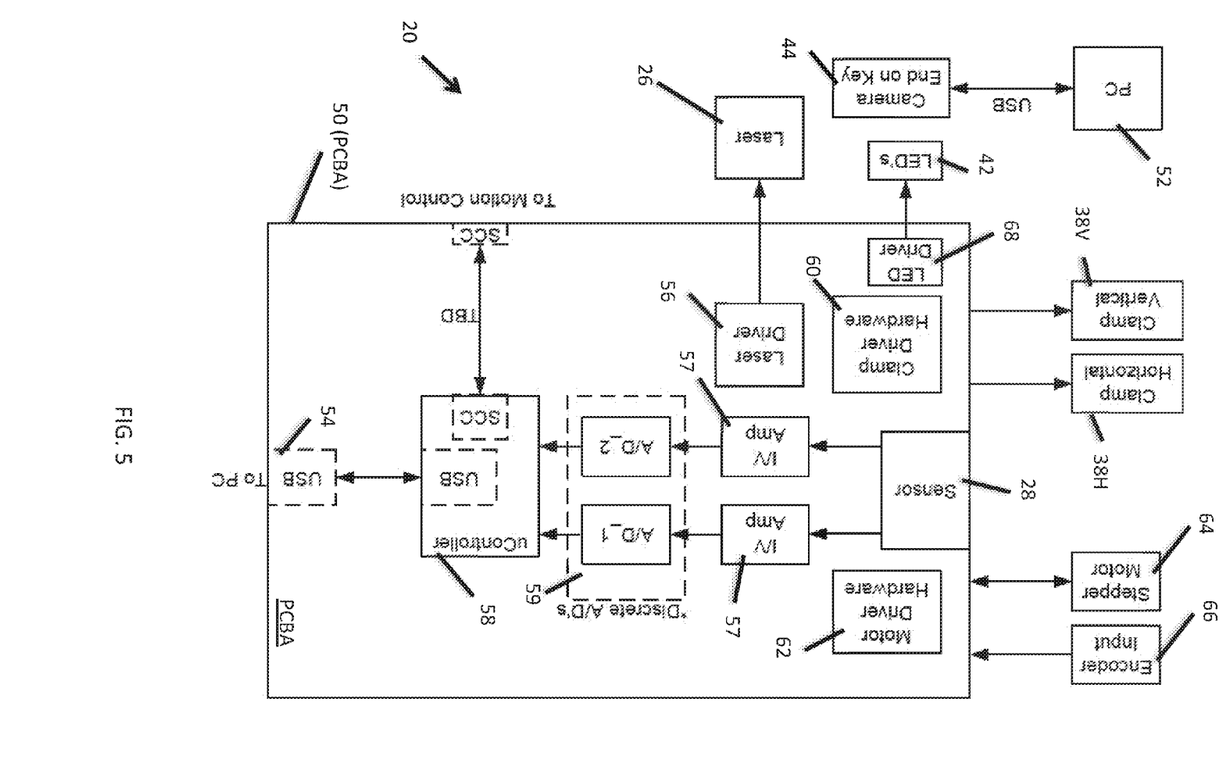
FIG. 5 is an electrical block diagram of certain components of a system 20 utilized for analyzing and duplicating a master key.

FIG. 5 depicts an exemplary electrical block diagram of circuitry and various components of the system 20 previously described with respect to FIGS. 2, 3, and 4. System 20 includes a main controller board (PCBA) 50 that is coupled to various system components and to a computer 52. It is to be understood that certain components of FIG. 5 have interconnections that for purposes of simplicity are not illustrated. Communication between PCBA 50 and computer 52 can be accomplished via a universal serial bus (USB) port 54. Computer 52 sends control commands to PCBA 50 and receives data from PCBA 50 that is usable to determine a proper key blank and for machining key blade 8 to provide a duplicate of master key 2. In one embodiment PCBA 50 is mounted to stage 40 and is mechanically coupled to PSD 28 as is depicted in FIG. 3.

PCBA 50 includes a laser driver 56 for providing power to laser 26. PCBA also includes a microcontroller 58 that receives a signal originating from from PSD 28 that is indicative of an amount of light traversing key blade 8. An analog signal from PSD 28 is amplified by amplifier 57 and then digitized by analog to digital converter 59 before reaching microcontroller 58. Microcontroller 58 processes the digital signal from analog to digital converter 59 and sends information to computer 52 that is indicative of the height of key blade 8 along intermediate key blade axis Z via the USB port 54.

In the illustrative embodiment sensor 28 outputs two analog signals. The amplified and digitized versions of the two signals are received by microcontroller 58. The two signals are processed by microcontroller 58 to determine a position coordinate ZC of a centroid of light beam 24 that has traversed key blade 8.

PCBA 50 includes a clamp driver 60 for operating clamping mechanism 38. In the illustrative embodiment clamping mechanism 38 includes vertical clamp 38V and horizontal clamp 38H for clamping master key 2.

PCBA 50 includes a motor driver 62 for controlling a stepper motor 64 for translating moveable stage 40 along major key axis Y. Motor driver receives positional feedback from encoder 66.

PCBA 50 includes an LED driver 68 for driving LEDs 42 for illuminating the distal end 6 of master key 2. Camera 44 provides information to computer 52 that is indicative of an end image received from distal end 6 of master key 2.

Figure 6:
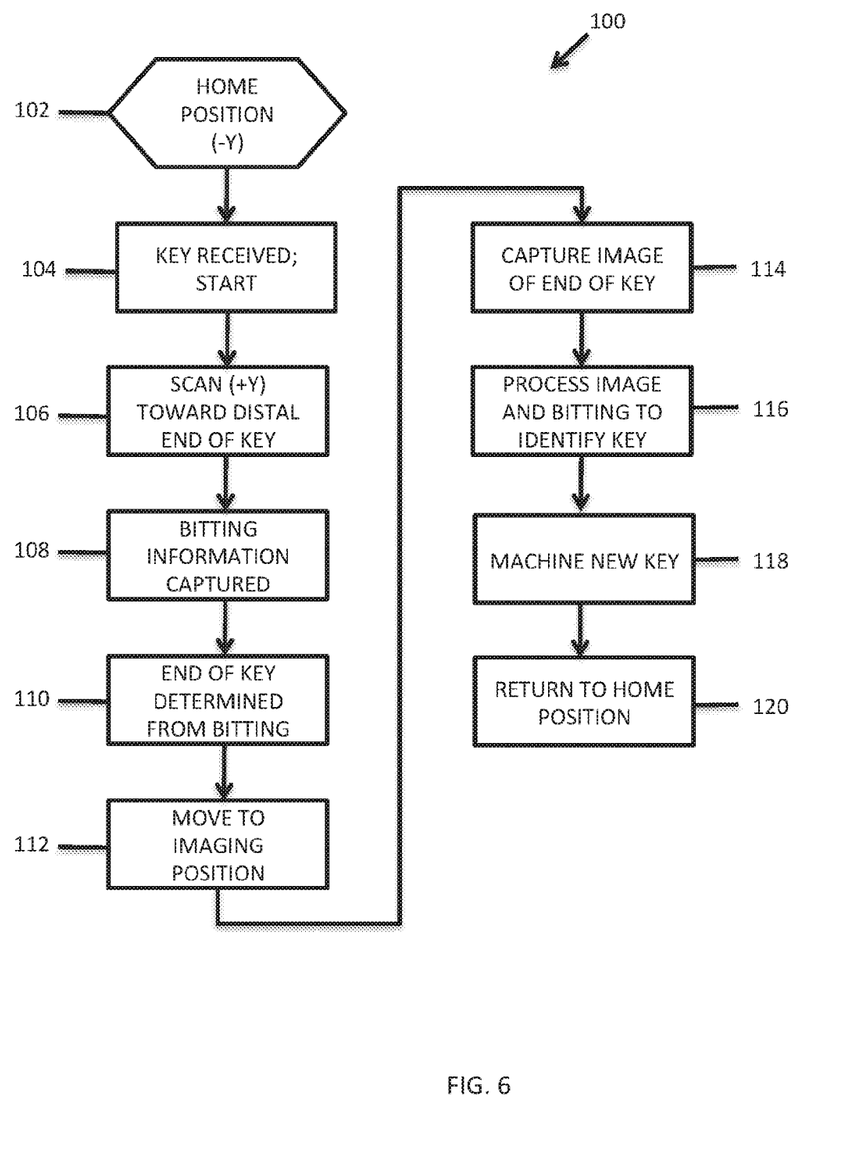
FIG. 6 is a flowchart representation of an exemplary embodiment of a method of duplicating a master key using the system depicted in FIGS. 2, 3, 4, and 5.

FIG. 6 is a flowchart depicting an exemplary process 100 for machining a duplicate of master key 2. For this exemplary embodiment the system 20 described with respect to FIGS. 2, 3, 4, and 5 is utilized. For this embodiment various optical path components 23 including laser 26, PSD 28, first mirror 32, and second mirror 34 are affixed to moveable stage 40 which moves linearly along the major key axis Y.

According to initial condition 102, the moveable stage is at a home position which is as far to the −Y position as possible. According to step 104, a master key 2 is received in clamping mechanism 38 and the process 100 is started. Also according to step 104 the master key 2 is clamped by clamping mechanism 38.

According to step 106 the stepper motor 64 is activated to scan moveable stage 40 in the +Y direction along the major key axis Y whereby the light beam 24 is moved or scanned toward the distal end 6 of master key 2. As the light beam 24 is scanned the bitting information is captured according to step 108. As part of step 108 the vertical extent of light beam 24 along intermediate key axis Y reaching PSD 28 is varied according to the extent of key blade 8 along intermediate axis Y. This variation results in a varying output signal from PSD 28 that is received and processed by microcontroller 58. Microcontroller 58 then generates and transmits information indicative of the bitting of master key 2 to computer 52.

According to step 110 a Y coordinate of the distal end 6 of master key 2 is determined according to the signal generated by PSD 28. When the light beam 24 passes the distal end 6 the computed centroid of light beam 24 along Z will be a minimum and a constant. The Y-position received from encoder 66 when the signal is first maximized will then be that of the distal end 6 of the key.

According to step 112 the system 20 uses the Y-position of distal end 6 to determine the proper positioning of camera 44 to focus on the distal end 6 of master key 2. Also according to step 112 the camera 44 is moved into the position for focusing on distal end 6.

According to step 114 camera 44 captures an image of the distal end 6 of master key 2. According to step 116 the image of distal end 6 and the bitting information (captured in step 108) are used to determine and enable a selection of a proper key blank. According to step 118 the selected key blank is machined using the bitting determined from step 108.

According to step 120 the master key 2 is released and removed from clamping mechanism 38. Also as part of step 120 the movable stage 40 moves in the −Y direction and back to the home position described with respect to step 102.

Figure 7:
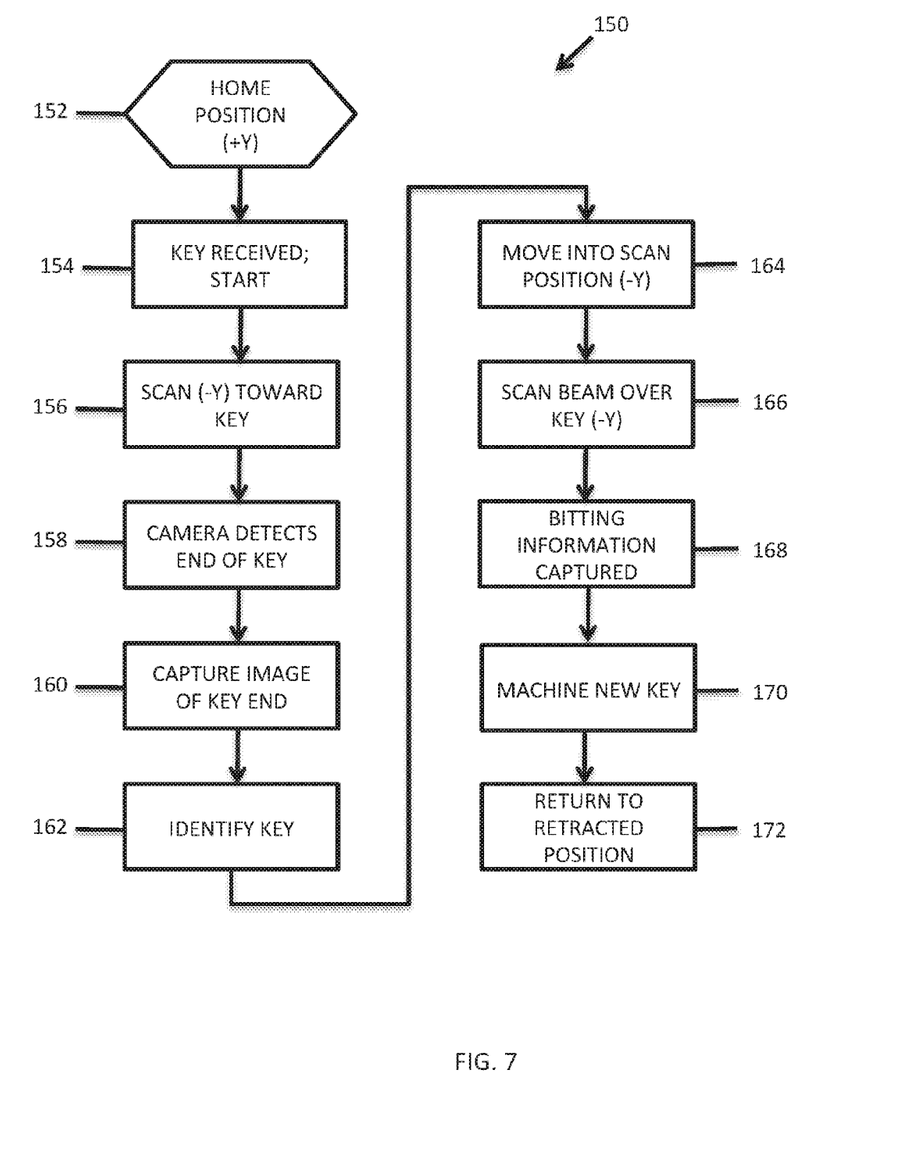
FIG. 7 is a flowchart representation of an alternative embodiment of a method of duplicating a master key using the system depicted in FIGS. 2, 3, 4, and 5.

FIG. 7 is a flowchart depicting an alternative exemplary process 150 for machining a duplicate of master key 2. For process 150 the system 20 described with respect to FIGS. 2, 3, 4, and 5 is utilized. For this embodiment various optical path components 23 including laser 26, PSD 28, first mirror 32, and second mirror 34 are affixed to moveable stage 40 which moves linearly along the major key axis Y.

According to initial condition 152 moveable carriage starts at a home position that is as far in the +Y direction along the major key axis Y as possible. In this position the light beam 24 will not intersect a master key 2 having the largest distal dimension Y (distal end 6) along major key axis Y.

According to step 154, a master key 2 is received in clamping mechanism 38 and the process 150 is started. Also according to step 154 the master key 2 is clamped by clamping mechanism 38.

According to step 156 the stage begins to move in the −Y direction while camera 44 attempts to focus on the distal end 6 of master key 2. According to step 158 camera 44 detects the end of master key 2 and determines a proper position of movable carriage 40 for proper focusing of camera 44 upon the distal end 6. According to step 160 the camera 44 captures an image of distal end 6 of master key 2. According to step 162 the computer 52 utilizes the image from step 160 to identify and enable selection of a proper key blank for duplication of master key 2.

Also according to step 158 system 20 (computer 52 included) determines a Y-location of distal end 6 of master key 2. Thus the system can move quickly to an optimal position according to step 164. According to step 166 light beam 24 is scanned along key blade 8. Also according to step 166 PSD 28 receives the variable light beam 24 versus time and outputs a signal to microcontroller 58. Microcontroller 58 provides information to computer 52 indicative of the bitting of master key 2. Thus the bitting information of master key 2 is captured according to step 168.

According to step 170 a new key is machined from the selected key blank. According to step 172 the master key 2 is unclamped and the carriage is returned to a retraced (+Y) home position as it started according to 152.

Other variations are possible. For example, the image obtained from step 160 and the bitting information from step 168 may be utilized to select the proper key blank.

An exemplary embodiment of system 20 has been described in which a motion of light beam 24 along major key axis Y is imparted by the motion of optical path components 23 mounted or affixed to moveable stage 40. An alternative embodiment of system 20 is depicted as system 20' in FIG. 8 in which optical path components 23' are stationary during an optical scan of master key 2. Stationary optical path components 23' cause light beam 24 to scan along major key axis Y of master key 2 without motion of the stationary optical path components 23'.

System 20' includes master key 2, clamping mechanism 38, laser 26, slit 30, lens 31 (not shown in FIG. 8), detector 28, and camera 44 that are all similar to like-numbered elements described with respect to FIG. 2. System 20' also includes scan module 200, first curved mirror 202, and second curved mirror 204. Scan module 200 can take on a number of forms. One example is a rotating galvanometer mirror. Another example is a rotating polygon mirror.

Figure 8:
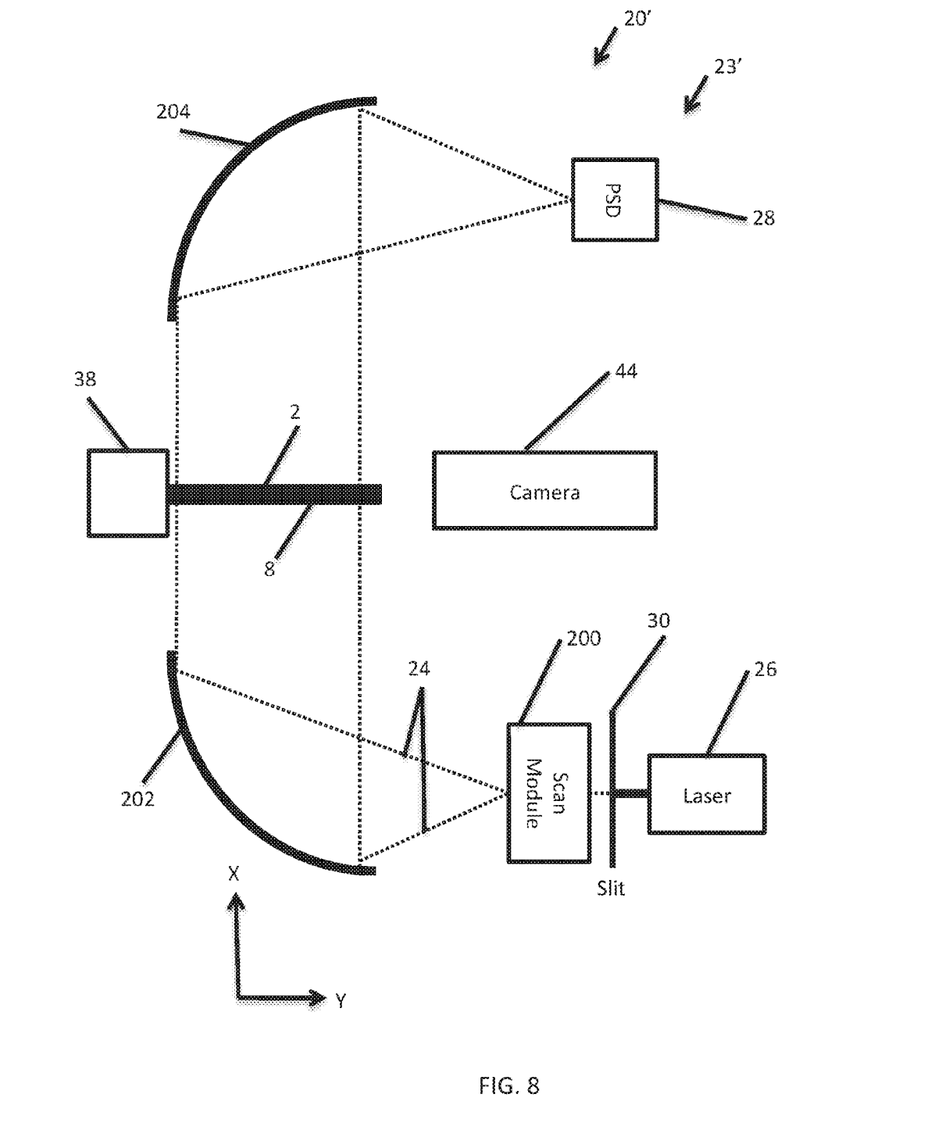
FIG. 8 is a schematic plan or top view of a certain components of an alternative system 20' utilized for analyzing and duplicating a master key.

In the exemplary embodiment of FIG. 8, scan module 200 causes light beam 24 to rotate back and forth as indicate by the dashed lines. Curved mirror 202 serves to change the path of light beam 24 such that it linearly scans across blade 8 of master key 2. Curved mirror 204 then causes light beam 24 to converge upon detector 28. The output from detector 28 in FIG. 8 is similar to that described with respect to FIG. 2.

Other variations of stationary optical components 23' are possible to eliminate a need for mechanical motion during scanning. For example, the scan module 200 can be designed to impart linear motion of light beam 24. Reflective optics for conveying the scanning beam to the key blade 8 and the detector 28 would then be selected to accommodate the linear scanning motion of light beam 24 for such an embodiment.

Referring back to FIG. 2, an exemplary embodiment has been described in which clamping mechanism 38 is fixed while light beam 24 moves across key blade 8. Alternatively, system 20 may be designed in which clamping mechanism 38 translates along major key axis Y while light beam 24 is stationary. This will result in essentially the same output from detector 28.

Thus, the specific embodiments and applications thereof described above are for illustrative purposes only and do not preclude modifications and variations encompassed by the scope of the following claims.

What we claim is:

1. A system for duplicating a master key comprising:
a mechanism for receiving and positioning a master key, wherein the master key defines a major key axis, an intermediate axis along which a key blade variably extends, and a minor key axis along a key thickness;
optical path components that direct a light beam along the minor key axis;
one or more apparatus that imparts relative motion along the major key axis between the light beam and the master key such that the light beam scans along the major key axis;
a detector that receives at least a portion of the light beam;
a processor configured to receive a signal from the detector use the signal to generate position information for a distal end of the master key; and
a camera configured to receive the position information from the processor and use the position information to capture an image of the distal end of the master key, wherein the image is usable for identifying a proper key blank for duplicating the master key.

2. The system of claim 1, wherein the light beam impinges upon the key blade such that a portion of the light beam is blocked by the key blade and another portion of the light beam traverses across the major axis of the key blade, and wherein the detector receives the portion of the light beam that traverses the key blade.

3. The system of claim 2, wherein the processor is further configured to use the signal from the detector to determine bitting information that is usable for duplicating the master key.

4. The system of claim 1, wherein the mechanism holds the master key in a fixed location and the relative motion is a result of motion of the light beam.

5. The system of claim 1, further comprising a laser for generating the light beam.

6. A method for duplicating a master key comprising:
receiving and positioning a master key, wherein the master key defines a major key axis, an intermediate axis along which a key blade variably extends, and a minor key axis along a key thickness;
generating a light beam and directing the light beam along the minor key axis;
imparting relative motion along the major key axis between the light beam and the master key such that the light beam scans along the major key axis;
determining position information for a distal end of the master key based on a detection of at least a portion of the light beam;
using the position information to capture an image of the distal end of the master key, wherein the image is usable for identifying a proper key blank for duplicating the master key.

7. The method of claim 6, further comprising:
generating a detection signal versus time based on the detection of at least a portion of the light beam, the detection signal verses time corresponding to a height of the key blade along the intermediate axis.

8. The method of claim 7, further comprising:
using the detection signal versus time to determining bitting information that is usable for duplicating the master key.

9. A system for duplicating a master key comprising:
a mechanism for receiving and positioning a master key, wherein the master key defines a major key axis, an intermediate axis along which a key blade variably extends, and a minor key axis along a key thickness;
a processor configured to receive image information from a camera and use the image information to generate position information for a distal end of the master key;
the camera being configured to capture an image of the distal end of the master key, wherein the image is usable for identifying a proper key blank for duplicating the master key;
optical path components that direct a light beam along the minor key axis;
one or more apparatus that imparts relative motion along the major key axis between the light beam and the master key, the one or more apparatus being configured to use the position information from the processor to position the light beam at the distal end of the master key and cause the light beam to scan along the major key axis; and a detector that receives at least a portion of the light beam; wherein the processor is further configured to use the signal from the detector to determine bitting information that is usable for duplicating the master key.

10. The system of claim 9, wherein the light beam impinges upon the key blade such that a portion of the light beam is blocked by the key blade and another portion of the light beam traverses across the major axis of the key blade, and wherein the detector receives the portion of the light beam that traverses the key blade.

11. The system of claim 9, wherein the mechanism holds the master key in a fixed location and the relative motion is a result of motion of the light beam.

12. The system of claim 9, further comprising a laser for generating the light beam.

* * * * *